United States Patent [19]
Bieback

[11] Patent Number: 5,990,793
[45] Date of Patent: *Nov. 23, 1999

[54] FIREFIGHTERS INTEGRATED COMMUNICATION AND SAFETY SYSTEM

[75] Inventor: John S. Bieback, Ellington, Conn.

[73] Assignee: Safety Tech Industries, Inc., Ellington, Conn.

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/299,121

[22] Filed: Sep. 2, 1994

[51] Int. Cl.$^6$ .................................................. G08B 23/00
[52] U.S. Cl. ............................. 340/573.1; 2/5; 340/521; 455/66; 455/100
[58] Field of Search .................................... 340/573, 521, 340/573.1, 573.6; 455/100, 66; 2/5; 128/201.19

[56] References Cited

U.S. PATENT DOCUMENTS

| | | | |
|---|---|---|---|
| 2,123,196 | 7/1938 | Millard | 128/201.19 |
| 2,950,360 | 8/1960 | Duncan | 381/176 |
| 3,069,511 | 12/1962 | Rehman et al. | 379/430 |
| 3,267,414 | 8/1966 | Kritz | 367/115 |
| 4,072,831 | 2/1978 | Joscelyn | 381/367 |
| 4,130,803 | 12/1978 | Thompson | 325/361 |
| 4,152,553 | 5/1979 | White | 379/430 |
| 4,156,292 | 5/1979 | Helm et al. | 2/422 |
| 4,166,978 | 9/1979 | White et al. | 455/82 |
| 4,491,699 | 1/1985 | Walker | 379/174 |
| 4,718,415 | 1/1988 | Bolnberger et al. | 128/201.19 |
| 4,736,740 | 4/1988 | Parker et al. | 128/201.19 |
| 4,756,308 | 7/1988 | Ryback | 128/201.19 |
| 4,799,263 | 1/1989 | Banziger et al. | 381/94 |
| 4,813,025 | 3/1989 | Rowland et al. | 128/201.19 |
| 4,885,796 | 12/1989 | Loftus et al. | 128/201.19 |
| 4,957,106 | 9/1990 | Vandeputte | 128/201.19 |
| 4,961,420 | 10/1990 | Cappa et al. | 128/207.12 |
| 4,980,926 | 12/1990 | Noetzel | 455/41 |
| 5,060,308 | 10/1991 | Bieback | 359/154 |
| 5,080,092 | 1/1992 | Tenna | 128/201.19 |
| 5,138,666 | 8/1992 | Bauer et al. | 381/169 |
| 5,142,700 | 8/1992 | Reed | 455/344 |
| 5,157,378 | 10/1992 | Stumberg et al. | 340/521 |
| 5,159,641 | 10/1992 | Sopko et al. | 381/169 |
| 5,219,290 | 6/1993 | Lapp et al. | 434/226 |
| 5,224,473 | 7/1993 | Bloomfield | 128/201.19 |
| 5,224,474 | 7/1993 | Bloomfield | 128/201.19 |

(List continued on next page.)

OTHER PUBLICATIONS

Voice Amplification and Two–Way Radio Interface, Scott Aviation, 1990, pp. 1–3.
Sigma Radio Communication System, Survivair, 1994, pp. 1–2.
The ESP© Communications System for Firefighters, MSA, 1994, p. 1–4.
Magnum Communication, International Safety Instruments, pp. 1–3.
Scott's New Wireless/Talk–Around, Scott, 1997, pp. 1–5.
Scott AV–2000 Voice Amplifier, Scott, 1996, pp. 1–2.
T–P.A.S.S.—Radio/Audio—Transmitting—Personal Alert Safety System, Grace Industries, Inc., pp. 1–2.
A Vital Link in a Hostile Environment, Golden West Communications, Inc., pp. 1–6.

*Primary Examiner*—Glen Swann
*Attorney, Agent, or Firm*—Fish & Richardson P.C.

[57] ABSTRACT

An integrated safety and communication system for attachment to a standard type of firefighter's face mask includes a command post tracking and accountability monitor, and a mask attachment having means for transmitting the amplified voice of the wearer to anybody within its audible range, and to enable communications with the command post including identification, location, vital signs such as pulse and respiratory rate, vicinity temperature, hydrocarbon monitoring and alarm signal if the wearer becomes motionless for a predetermined time period.

20 Claims, 10 Drawing Sheets

U.S. PATENT DOCUMENTS

| | | | |
|---|---|---|---|
| 5,279,286 | 1/1994 | Chen | 128/201.19 |
| 5,307,793 | 5/1994 | Sinclair et al. | 128/201.19 |
| 5,319,711 | 6/1994 | Servi | 380/23 |
| 5,323,774 | 6/1994 | Fehlauer | 128/206.12 |
| 5,329,637 | 7/1994 | Walker | 340/573 |
| 5,371,804 | 12/1994 | Bauer | 381/169 |
| 5,385,141 | 1/1995 | Granatiero | 455/66 |
| 5,404,577 | 4/1995 | Zuckerman et al. | 381/168 |
| 5,428,688 | 6/1995 | Becker et al. | 381/168 |
| 5,433,612 | 7/1995 | Daku | 434/226 |
| 5,463,693 | 10/1995 | Birli et al. | 381/75 |
| 5,479,408 | 12/1995 | Will | 370/94.1 |
| 5,503,141 | 4/1996 | Kettl et al. | 128/201.19 |
| 5,515,419 | 5/1996 | Sheffer | 379/58 |
| 5,552,772 | 9/1996 | Janky et al. | 340/573.4 |
| 5,566,362 | 10/1996 | Bauer et al. | 455/90 |
| 5,572,990 | 11/1996 | Berlin | 128/201.19 |
| 5,605,145 | 2/1997 | Hannah et al. | 128/201.19 |

 FIG. 8A — I.D. SIGNAL, 85
 FIG. 8B — MASK PRESSURE, 89
 FIG. 8C — VITAL SIGNS SIGNAL, 80
 FIG. 8D — HELP SIGNAL, 83
 FIG. 8E — ENVIRONMENT SIGNAL, 87
 FIG. 8F — MOTION DETECTOR, 82
 FIG. 8G — MANUAL DISTRESS, 84
 FIG. 8H — LOCATION BEACON, 86
 FIG. 8I — ENVIRONMENT ALARM, 87
 FIG. 8J — EVACUATE SITE ALARM, 88

FIREFIGHTERS INTEGRATED COMMUNICATION AND SAFETY SYSTEM

FIELD OF THE INVENTION

The invention relates to a communications and safety system and, more particularly, to an integrated communications, tracking, monitoring and accountability system for improving safety and effective utilization of firefighters at a fire.

BACKGROUND OF THE INVENTION

Fireground personnel accountability is a vital safety issue for the fire service. In the future, the fire service will see increased pressure from litigation, other court action, and regulation and standard setting bodies to improve the manner in which we account for our firefighters operating in life-threatening work environments.

Why the need for improved accountability? A 10-year study of firefighter deaths conducted by the National Fire Protection Association (NFPA) found that 34 of 134 firefighter Fireground deaths not related to heart attacks reflected a failure to account for personnel. That's a 25 percent fatality figure related to accountability. That should not be happening.

Any firefighter suspected to be missing must be assumed lost in the hazard zone and immediately reported to command. Simultaneously with a roll call, command must initiate a search-and-rescue effort, starting at the last reported location of the missing firefighter. An additional alarm should be struck to obtain additional resources. There can be no hesitation since the window of survivability for the lost firefighter is very narrow.

An accurate means of coordinating and documenting search efforts must be developed (e.g., grids searched, ways to avoid duplication of or missing grids). Very strict control over firefighting personnel must be maintained during rescue efforts to control "panic actions" and freelancing by crews.

Communication is a critical component of effective fireground command. In the investigation of the operations at any incident, indicate that communications problems exist from the outset and continued for most of the duration of an incident.

Specific two-way communications from a stationary incident commander to interior operating officers, sector officers, and any other ICS (Incident Command System) positions must be accomplished and completed.

Communications between firefighters and company officers by visual and audible means also must exist at the intercompany level. Good communication is the foundation of a fireground accountability/safety system.

In recent years a great deal of interest has been shown in the provision of a means to enable unmuffled voice communication from a protective firefighters mask and the like. Some illustrative examples are shown in the patents noted below.

U.S. Pat. No. 4,508,936 issued Apr. 2, 1985 to Robert Ingall, shows and describes a communication system that utilizes an amplifier/speaker unit (32) that is mounted on the firefighter's waist-belt and is connected to the face mask via a cable (30).

The system appears to use an induction method of transmission which is relatively sumptuous of battery energy and can either cause interference with and/or receive interference from external transmission signals. Another problem with this device is the high possibility of getting the cable (30) caught on something like a nail or other projecting object resulting in possible loss of communication and/or dislodging the face mask of the wearer while in a hazardous air (fire) environment.

U.S. Pat. No. 3,180,333 issued Apr. 27, 1965 to R. D. Lewis appears to show and describe a gas mask device that uses a signal transmitting line (50) mounted to the belt of the wearer. The amplifier unit is molded into/for a specific mask and therefore has limited use, which increases its relative repair/replacement costs. The amplifier and microphone appear to be hard wired through the mask by an adaptor which therefore results in a breach of the mask wall. The breach may result in a loss of integrity of the mask. This device also has the inherent problems noted above with regard to the Ingall's patent.

Other prior art patents of interest include U.S. Pat. No. 3,314,424 issued Nov. 14, 1962 to M. Berman; U.S. Pat. No. 2,953,129 issued Sep. 20, 1960 to A. Bloom et al; U.S. Pat. No. 2,997,550 issued Aug. 22, 1961 to A. D. Trader; U.S. Pat. No. 3,540,442 issued Nov. 17, 1970 to Robert L. Holloway; and U.S. Pat. No. 2,950,360 issued Aug. 23, 1960 to R. K. Duncan.; U.S. Pat. No. 4,491,699 issued Jan. 1, 1985 to Martin J. Walker; and U.S. Pat. No. 5,060,308 issued Oct. 22, 1991 to John S. Bieback.

These patents are mentioned as being representative of the prior art and other pertinent references may exist. None of the above cited patents are deemed to affect the patentability of the present claimed invention. The present invention involves a novel combination of features and components combined in such a way as to afford a very efficient, cost effective, relatively more reliable, easier to use solution to the difficulties and problems encountered with the prior art.

The present invention resides in part on the use of signal coupling between the microphone and the speaker-amplifier.

The mounting of the microphone unit on the mask and the speaker-amplifier on the outside of the mask. The obviating of any need for connecting cables. The ease and interchangability of the microphone and the speaker amplifier for quick and simple repair. The ease of replacing batteries. The relative ease of use obviating the need for connecting cables and mounting speakers to belts and the like.

The monitoring of the identity of each activated unit by transmitting a signal to a command post. The location of each activated unit being monitored at the command post. The selective monitoring and recording of communications between the command post and site involved firefighters, i.e., activated units, and/or the communications between activated units. The automatic monitoring and alarm of hazardous conditions such as excessive temperature and hydrocarbons at the units location. The automatic monitoring of the firefighters vital signs and activity level.

SUMMARY OF THE INVENTION

A communication system for use in combination with a face mask such as utilized by firefighters, generally comprising:

a small housing dimensioned and contoured for being mounted to the interior of the mask;

a microphone secured to said housing;

transmitter means operatively coupled to said microphone for transmitting an communication signal through said mask indicative/representative of the wearers speech into the microphone;

an external housing dimensioned and contoured for being mounted to the exterior of the mask;

a power source secured within the exterior housing and being operatively coupled to said microphone and said transmitter means;

a receiving means secured to said exterior housing for receiving said transmitted communication signal and generating an electrical signal representative of said communication signal;

speaker means mounted to said exterior housing being responsive to said electrical signal for producing a voice/audible speech signal representative of and generally simulating the wearers speech into the microphone, means for monitoring the vital signs of the wearer and transmitting a signal representative thereof;

means for transmitting a unit identification signal;

means mounted to said housing for monitoring and transmitting a signal representative of the temperature and/or hydrocarbon and/or poisonous gas levels of the region about the firefighter;

means for monitoring and transmitting a signal indicative of the firefighter being motionless for a predetermined period;

means for transmitting a distress-help signal;

means for transmitting a locating or tracking signal to facilitate the rescue of a firefighter;

command post means for receiving said signals being transmitted by an activated mask unit for monitoring and directing the activities of each firefighter and for maintaining accountability and tracking of each firefighter at the site and for improving communications and safety of each activated firefighter.

OBJECTIVES OF THE INVENTION

It is the general object of the present invention to provide a new and improved communication system/device capable of being affixed to different types of face masks or gas masks of a self contained breathing apparatus (SCBA).

Another object of the present invention is to provide a communications system that is relatively compact in size and is mounted directly on a mask face piece lens such as those used in rescue operations.

Another object of the present invention is to provide a communications system mounted on a mask face piece lens without interfering with the sealed air breathing system of the mask.

Another object of the present invention is to provide an improved communication device that can be readily affixed to many different standard type masks without special tools or skill and relatively inexpensively.

Another object of the present invention is to provide a communication system that obviates any need for external connecting cables that may become entangled or caught on projecting objects.

Another object of the present invention is to provide a communication system for a self contained breathing apparatus that does not require time consuming connections and belt mounting of constituent components thereby reducing time response to emergency situations.

Another object of the present invention is to provide a relatively small, compact and easy to use communication system for a mask as used by firefighters in interior firefighting operations and/or areas involving hazardous chemical spills.

Another object of the present invention is to provide a mask communications system with a voice actuated switch (VOX) and/or a motion type switch or an air pressure activated device in the mask unit to energize the battery power in both the inside and outside units. The purpose of this system is to eliminate the manual power switch which could be unintentionally left on and thus drain the batteries or a standand 9 volt battery.

Another object of the present invention is to provide a mask communications unit that would be designed and constructed to meet the rigorous use normally found in a fire ground operation by withstanding high and low temperatures, humidity, impact, dust, leakage, corrosion tests, and be intrinsically safe.

Another object of the present invention is to provide a mask voice communications system that contains the audio amplifier, speaker, a piezoelectric element, and small button type rechargeable batteries.

Another object of the present invention is to provide a mask communications system that is comprised of two separate units, both units are mounted on the face piece directly in-line and opposite of each other. The outside unit contains the audio amplifier, speaker, batteries.

Another object of the present invention is to provide an integrated communications and safety system.

Another object of the present invention is to provide a combined communications and safety and accountability system for: improving voice communications from a protective face mask; and for communications via radio like signals with a command post; and monitoring the identity of each active unit firefighter; and for recording all communications;

Another object of the present invention is to provide a system for monitoring the location of each activated mask unit at a fire.

Another object of the present invention is to provide a system for monitoring the temperature of the environment about an activated mask unit.

Another object of the present invention is to provide a system for monitoring the hydrocarbon levels in the environment at an activated mask unit.

Another object of the present invention is to provide a system for signaling help is needed by a firefighter both when the firefighter is conscience and/or unconscience.

Another object of the present invention is to provide a system for alerting one or more firefighters to immediately vacate the structure or site.

Another object of the present invention is to provide a system for facilitating the locating and rescuing of a firefighter.

BRIEF DESCRIPTION OF THE DRAWINGS

Other objects and advantages of the present invention will be evident from the following detailed description when read in connection with the accompanying drawings which illustrate the preferred embodiments. Similar reference numerals refer to similar parts throughout.

FIGS. 8a–8j are different signal waveforms for controlling various functions in accordance with the invention;

DESCRIPTION OF THE PREFERRED EMBODIMENT

In the past five years or so, firefighting techniques and equipment have changed dramatically. Aggressive interior firefighting was limited to the protective clothing and air breathing equipment available. The self-contained breathing apparatus (SCBA) was not available for each firefighter on the fire scene. They were heavy, cumbersome and it took valuable time to put on. Recently, the National Fire Protection Association (NEPA) along with the International Firefighters Association (IFFA) has upgraded and set specifications for manufacturers, both in firefighter's protective clothing and equipment, to withstand higher temperatures and to provide maximum safety. Specifically the SCBA has become lighter in weight, smaller in size with improved visibility, and an increased air capacity to allow a firefighter to operate longer and safer in an interior firefighting environment.

The increase use of synthetic materials such as plastics (i.e. foam cushions, synthetic rugs, and PVC articles) which are now used extensively in the make-up of furniture and other components within a building, has become an extreme hazard during fire. They generate intense heat with rapid fire spread and most of all their combustion by-products give off dense smoke that contains lethal gases such as hydrogen cyanide, sulfur dioxide, and carbon monoxide. This is a major difference as compared to wood and cotton by-products used ten to fifteen years ago. Inhalation of these gases has cost cities and towns thousands of dollars in compensation, liability payments, and death benefits. Additional responsibilities that fire departments have recently been required to handle are hazardous material accidents. These are spills or an accidental discharge of hazardous materials such as hydrogen chloride, lethal insecticides, cryogenic material and corrosive gases.

Again, use of the SCBA is the primary protection for the firefighter during the containment and control of these incidents. Due to the increase in hazards that the firefighter is being exposed to, many fire departments are requiring a mandatory mask policy. That is, each firefighter is now provided with a SCBA and is required to use it during all hazardous operations either in interior fire fighting or exterior chemical spills. The need for clear communications through the mask has now become more significant than ever. Due to the increase in use of the SCBA and for the safety of the FIREFIGHTERS in zero visibility environment, verbal communications is the only link to maintain contact with each other while conditions and unknown hazards are constantly changing.

Figure 1:
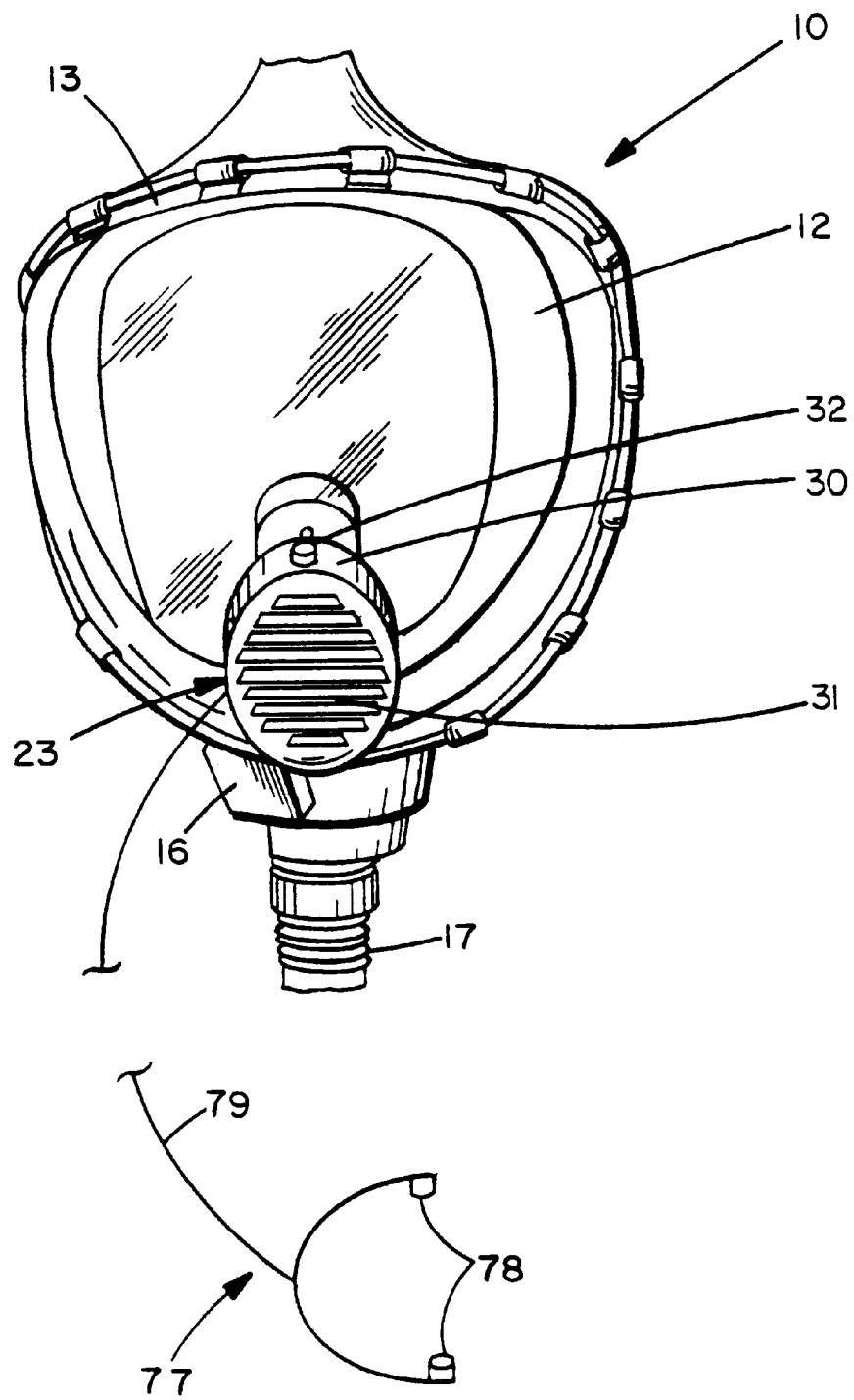
FIG. 1 is a front view of a mask with the system affixed thereto in accordance with the invention.
Figure 5:
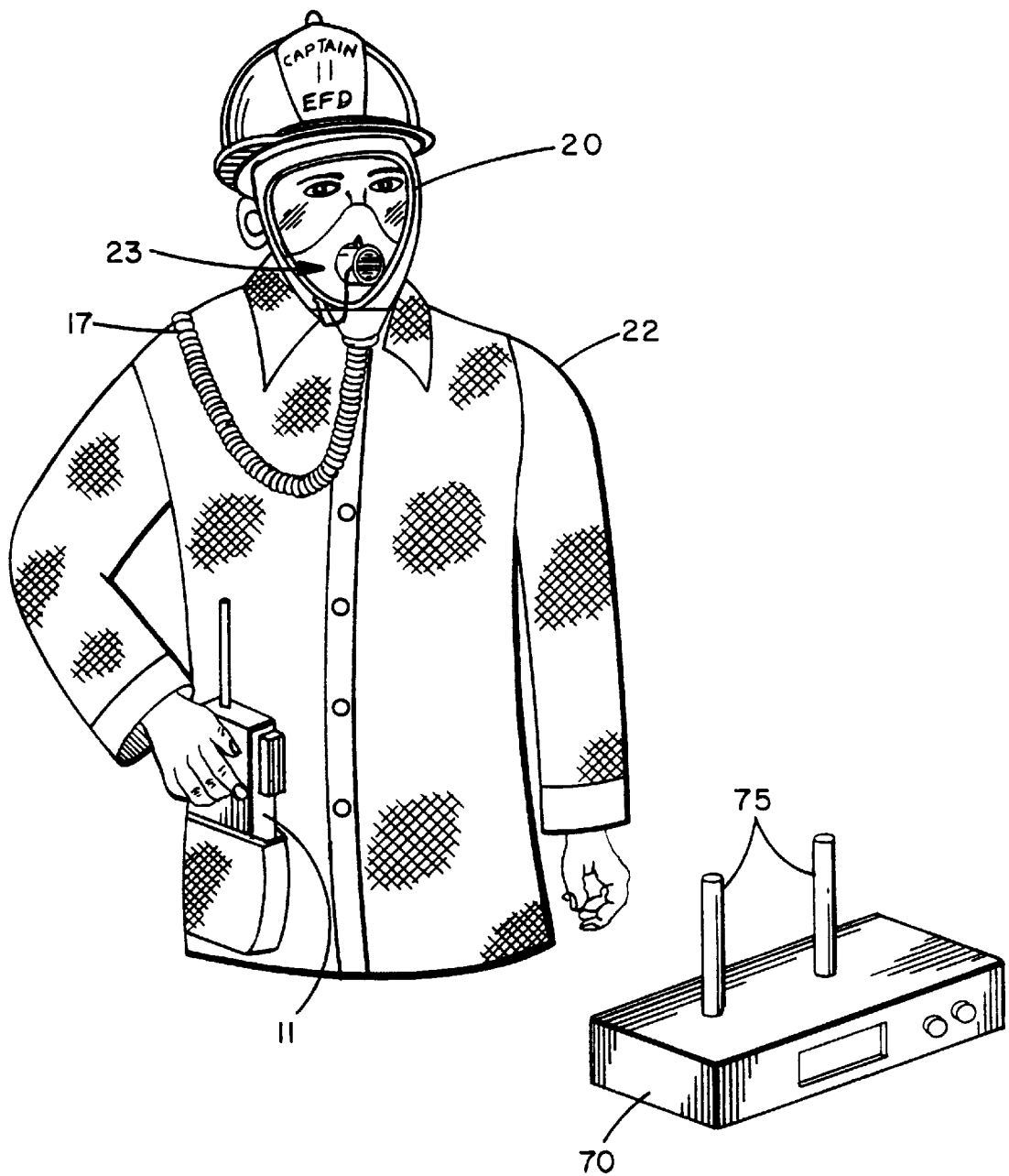
FIG. 5 is a plan view of the communication system in accordance with the invention.

Referring now to the drawings in general and to FIG. 1 in particular, shown therein is a SCBA mask 10 with a communication system or device 23 mounted to the mask lens 12 in accordance with the present invention. The SCBA mask 10 is generally conventional and has a transparent face plate or lens 12 secured to a frame 13, one or more belts or straps for securing the SCBA mask 10 on the head of, for example, a firefighter 22 (as seen in FIG. 5).

The face piece or frame 13 may be formed from a flexible impervious material such as rubber, plastic or other elastomeric material. The peripheral portions of the face piece or frame 13 are adapted to closely conform to the face or head of the wearer. The chin portion is dimensioned and contoured to enable the wearer to have substantial chin movement to permit the wearer to speak within the mask 10. The gas or SCBA mask of the kind with which the present invention is adapted to be employed have their lower portions equipped with one or more outwardly projecting tubular extension means 16 which provide air passage means, for example, as an air or oxygen inlet and an air outlet, or both. Extension 16 provides a passageway for supplying air to the face of the wearer.

The passageway is generally connected to a suitable air conduit or air hose 17, which, in turn, is connected to a source (not shown) of compressed air or oxygen. It will be understood that this invention is not limited to the particular type of tubular air conduit as illustrated herein.

Since the SCBA mask may be of conventional design such as a "SCOTTORAMIC" (trademark of Scott Aviation, Lancaster, N.Y.) Mask, exhaustive detail of such masks shall not be incorporated herein to avoid prolixity. It should be understood at this time that an important and advantageous feature of the present invention is the ability to readily and inexpensively affix the communication system 23 to many different types of conventional (SCBA) masks, i.e., flexibility and universality.

In this manner, the cost of equipping, repairing and replacing the communication system 23 onto already owned/used masks is relatively inexpensive. It should be noted also that replacement of either the external speaker unit 30 or the internal microphone unit 61 (FIG 2.) may be affected.

Figure 2:
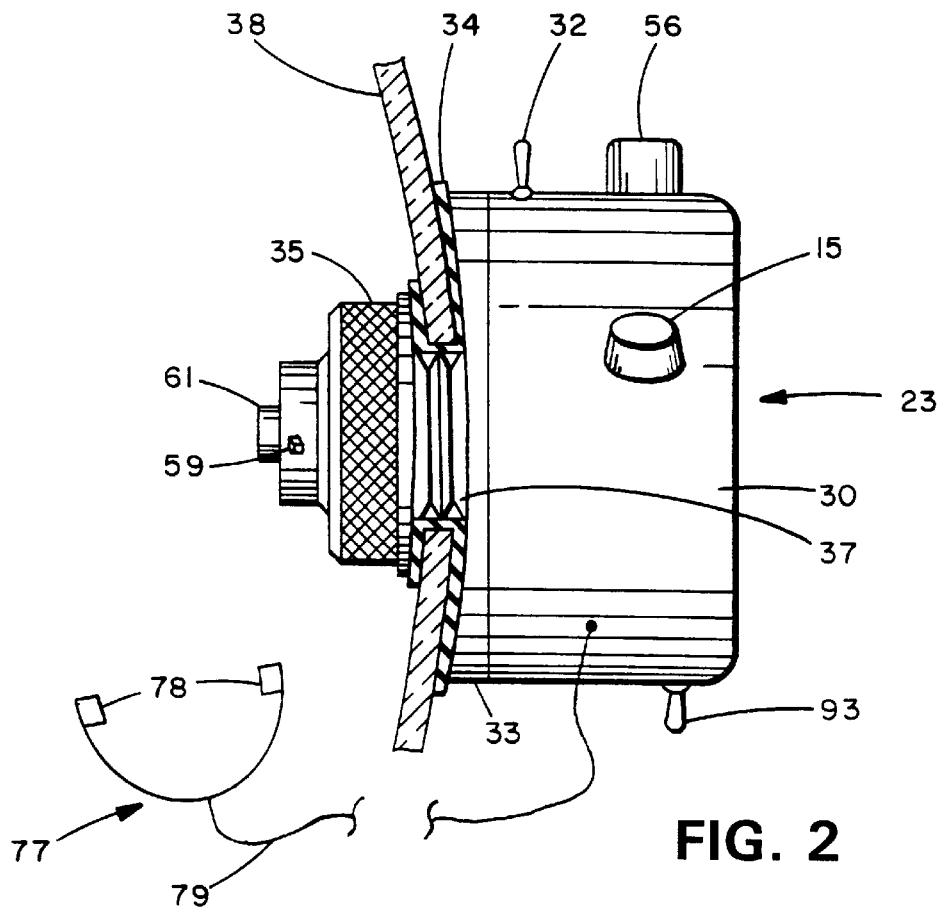
FIG. 2 is a perspective side view of the mask and communication system shown in FIG. 1.
Figure 3:
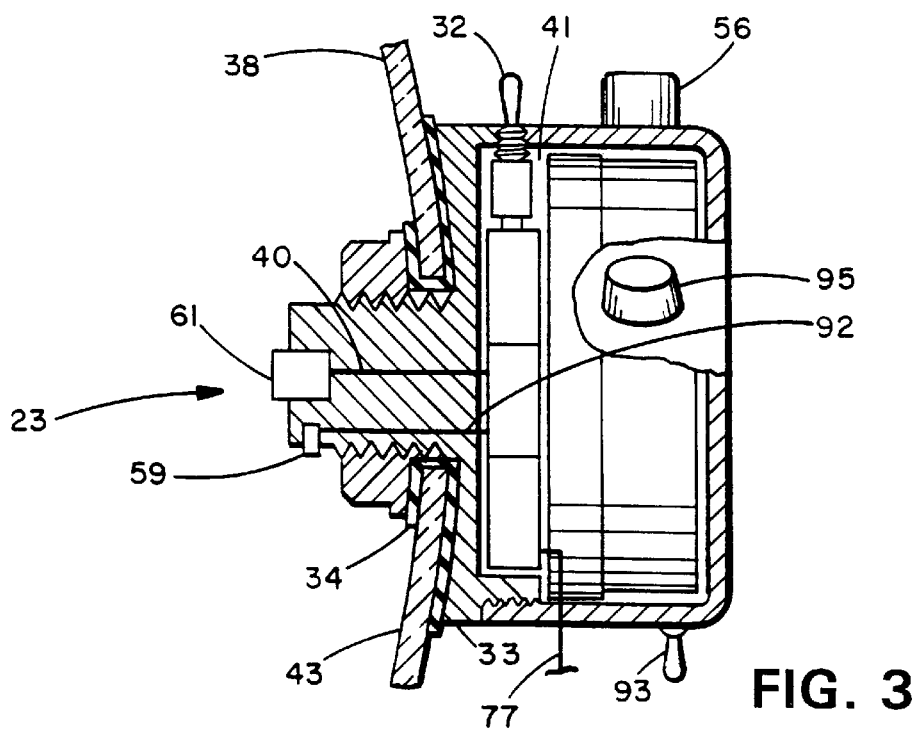
FIG. 3 is a sectional plan view of the communication system's mask attachment unit detailing the constituent components thereof.
Figure 4:
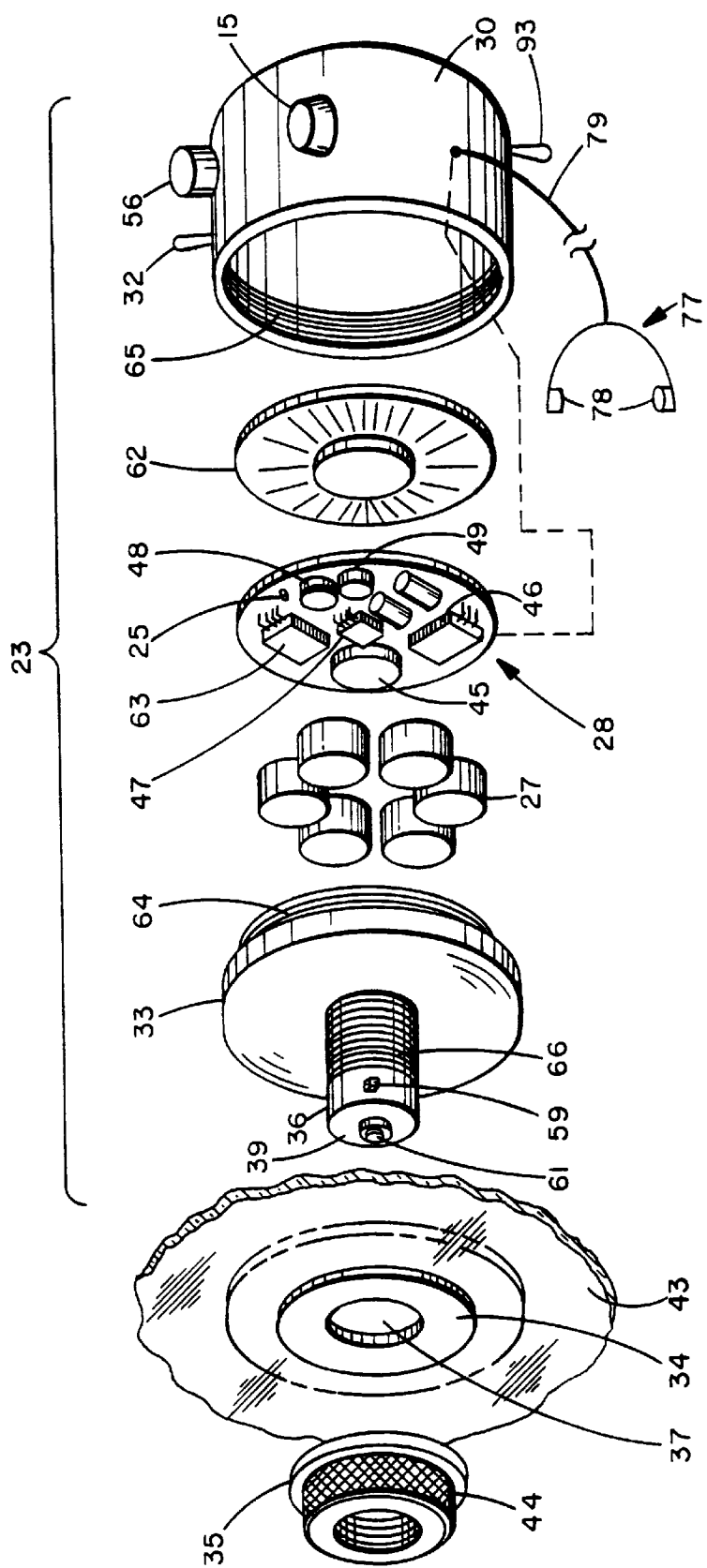
FIG. 4 is an exploded schematic/plan view of the mask attachment unit shown in FIG. 3.

With reference now to FIG. 2, 3, and 4, a simplified embodiment of the present invention is illustrated. The firefighter 22 in FIG. 5 is shown wearing an SCBA type mask 20, having mounted thereon a communications and safety attachment unit 23 in accordance with the invention. Basically speaking as best seen in FIG 4, the attachment unit 23 comprises a microphone 61, a radio interface transmitter/transceiver 63, a speaker 62, a power source 27, and an electronics package 28, which includes an audio amplifier, and accountability/distress units 50–59 (see FIG. 7).

The speaker unit 62 generally has a tubular shape of relatively small diameter, for example, between one-half and two inches and a length between approximately one and one-half inches.

The outwardly facing surface is perforated with holes or a grill like structure 31 (FIG. 1) to enable the speaker's sound to emanate therefrom. An on/off switch 32 is provided to enable or energize the amplifier-speaker unit. The end portion 33 has a concave shaped portion or surface dimensioned and adapted for accommodating, i.e., being placed in juxtaposition with, the convex exterior surface of many standard SCBA type masks.

End portion 33 may be secured to the tubular section 30 by conventional means such as screw treads or one quarter turn bayonet type connectors. The concave portion may be formed of any suitable material such as, for example, rubber, plastic and the like. A relatively soft layer (not shown) may be provided to accommodate slight curvature variations of the different mask manufacturers. This rubber washer like member 34 also absorbs possible shock from a bang of unit 30 with another object. The concave end portion is affixed, for example, by means of a retaining nut like member 35 being screwed onto the threaded portion of neck member 36. Neck member 36 projects through an opening 37 and into the inside region of the mask unit 20.

Figure 7:
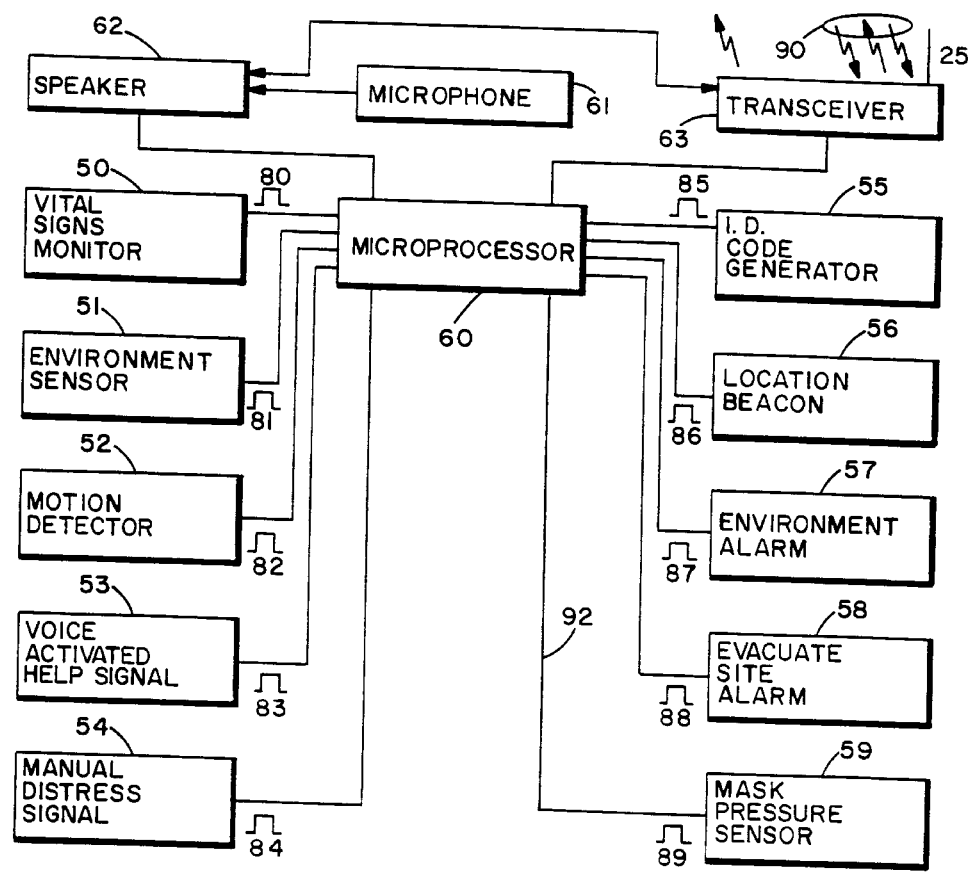
FIG. 7 is a block diagram of the logic/plan for the system comprising the mask attachment unit in accordance with the invention.

The microphone 61 is secured within the end portion 39 of neck member 36. Microphone 61 is connected, via lead 40, to the audio amplifier/electronics 28 and speaker 62 and to the voice activated distress or help monitor circuitry 53 (FIG. 7). The inner surface of nut member 35 generally has a convex shape to be placed in alignment with the curved inner surface 43 of the SCBA mask 20. A rubber like seal 34 provides an air tight seal with nut member 35 being firmly fastened unto neck member 36.

As can be readily seen, the mask communication unit 23 may be quickly mounted and tubular unit 30, which contains the speaker-amplifier and receiver electronics, may be readily removed and re-affixed to end portion 33. The constituent internal components of tubular unit 30 will be described in more detail hereinafter with reference to FIG. 7.

As can be readily seen, the mask attachment unit 23 may be quickly removed by hand with the unscrewing of nut member 35 which has etching grooves 44 for improved finger grip. It should be noted also that the unit 23 may be readily serviced, i.e., batteries replaced, by unscrewing the enclosure of outer cap 30.

Figure 6:
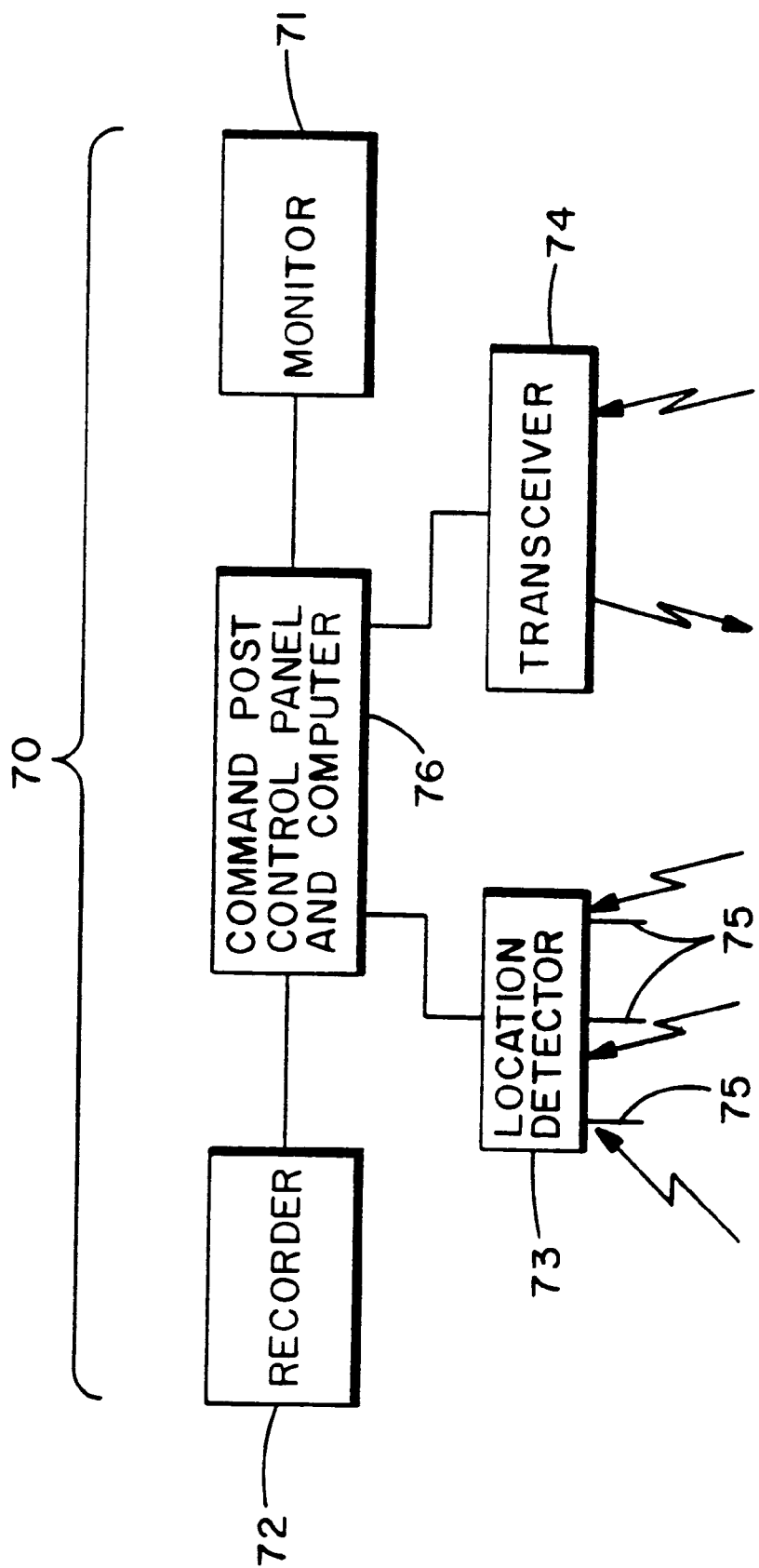
FIG. 6 is a block diagram of the logic/plan for the system comprising the command post in accordance with the invention.

An important feature of the invention is the improved safety of the firefighter 22. Accordingly, the mask attachment unit 23 is monitored by a command post distress monitor 71 (FIG. 6). Mask unit 23 is programmed to detect a verbal request for "help" and in response transmits a distress or help signal 83 (FIG 8d) to the command post 70 that the firefighter requires help. In this embodiment or version of the invention, two way communications with the command post 70 is accomplished via a standard portable transceiver 11. This version of mask unit 23 and monitor unit 71 may also include one or more of the safety features as illustrated in FIG. 6 and 7.

With reference to FIG. 3, there can be seen a sectional plan view of the attachment unit 23. The end unit 30, includes the communications and safety electronic circuitry package 28, which includes, as seen in FIG. 7: microphone 61, vital signs monitor 50, environment sensor 51, motion detector 52, voice activated distress signal 53, manual distress signal means 54, identification code generator 55, location beacon 56, dangerous environment signal indicator 57, vacate site/building alarm 58, mask pressure sensor and alarm unit 59, and transceiver 63.

With reference now to FIG. 4, an exploded view of the mask attachment unit 23 is illustrated. The outer housing 30 is of tubular construction and may be formed of any suitable material such as plastic. Speaker 62 is of conventional design and dimensioned for being inserted within housing 30. An integrated electronics package 28 is provided having circuitry and programming components such as items 45–49, corresponding to the logic or flow diagram illustrated in FIG. 7. Since the circuitry of each constituent component, such as microprocessor 60, may be of conventional design, exhaustive details thereof shall not be provided herein to avoid prolixity. One or more batteries 27 are provided to power the mask attachment unit 23.

A mounting piece 33 having a circular configuration is provided for attaching unit 23 to the mask 20,10. Mounting piece 33 includes an alcove 41 (FIG. 3) for receiving the power pack 27, and a cantilevered neck portion 36 dimensioned for being inserted through hole 37 in mask 20. Mounting piece 33 contains a set of male threads 64 for securing to the female threads 65 of housing 30. Neck portion 36 contains male threads 66 for receiving nut unit 35 at the inside of mask 20,10. As noted above, nut unit 35 contains a surface 44 for provided easy finger gripping to enable tightening unto and removal from neck unit 36.

A rubber seal 34 is provided about the opening 37 in mask 20. Tightening of nut 35 causes nut 35 to pull inwardly on neck unit 36 thereby compressing the rubber seal 34 on both sides of mask 20 and providing an air tight seal.

A pulse rate detector 77 is provided for monitoring the firefighter's pulse rate and transmitting such vital signs data to the command unit 70. The pulse rate detector 77 includes an ear lobe clip 78, which may include conventional design for detecting the pulse within the ear, with being clipped under spring bias to the firefighter's ear or other body portion. Detector 77 is coupled, via lead 79, to the vital signs monitor 50 circuitry.

An air pressure detector 59 is mounted to neck portion 36 and is coupled, via lead 92, to the pressure sensor and alarm unit 59.

With reference now to FIGS. 5–8, the details and concepts of the invention will now be described.

The command post or center 70 generally comprises an operator control panel 76, a monitor 71, a recorder 72, a location detector 73 and a transceiver 74. The command post 70 may be configured within a standard fire vehicle or van (not shown). The control panel 76 includes controls to enable the command post operator to voice communicate, via transceiver 74, with each firefighter selectively and/or collectively. In this manner improved command post monitoring and controlling of the firefighting efforts is possible.

The recorder 72 may comprise a standard type video and/or audio recorder. The basic function of recorder 72 is to document the communication, firefighter's locations and monitored signals on a time scale. In this manner, in light of growing litigation concerning failure to properly evacuate and rescue firefighters etc., a record of the firefighter's events is provided for later review.

The monitor 71 is a visual display device (CRT) which is operatively coupled to (or includes) a computer or microprocessor and to the location detector 73. The location detector 73 includes two or more antenna devices 75 which are spaced apart. These antenna devices 75 receive a location signal being periodically transmitted from the mask attachment unit 23. A so called triangulation of the location signals of each firefighter is effected and a location marker is displayed on monitor 71. In this manner, the general location of each firefighter within and about a fire site who has activated his/her mask unit is possible. Thus, in accordance with an important feature of the invention, relatively improved accountability of the firefighters location is provided, which facilitates locating and rescue efforts. Since both triangulation and monitor display technology are known in the prior art, a detailed discussion thereof will not be provided. It should be recognized, however, that in accordance with the present invention an important point of novelty is the transmission from the mask attachment unit of an encoded tracking signal or digital pulses 85 to facilitate location tracking on monitor 71 of selective and/or all activated mask units. The tracking signal may also serve as the I.D. signal 85 (FIG. 8a).

Referring now to FIG. 7, a diagram of the mask attachment unit's electronics is illustrated. The electronics package 28 generally comprises a radio interface, to transmit from the mask to a portable transceiver 11, and a central microprocessor 60 which is operatively coupled to a vital signs monitor 50, an environment sensor 51, a motion detector 52, a voice activated distress (HELP) monitor 53, a manual distress (need help) activator 54, and identification (ID) code generator 55, a mask pressure sensor 59, a microphone 61 a speaker 62 and a transceiver 63.

The circuitry of each of the above noted functional items may be of conventional design, and therefore, a detailed description will not be provided to avoid prolixity. The transceiver 63 may also include a wire like antenna 25 for transmitting the various signals 80–89 and voice communications.

The microphone 61, speaker 62 and transceiver 63 enable two-way conversation between the command post 70 and the firefighter 22. The microphone 61 and the speaker 62 provide the firefighter 22 the ability of talking to other firefighters and persons through the mask with speaker 62 amplified voice volume.

Transceiver 63 under the control of the microprocessor 60 periodically causes the transmission of an I.D. signal 85, a mask air pressure signal 86, and a vital signs signal 87. These signals 80–89 are received by the command post 70 transceiver 74 and location detector 73 for monitoring by the command post personnel via monitor 71.

The I.D. code generator 55 provides the I.D. signal 85 which is gated or switched under microprocessor 60 control to transceiver 63, which in turn is transmitted to transceiver 74.

The mask pressure sensor 59 may be of conventional design and being mounted within mask unit 23, for example on neck unit 36, and is operatively coupled, via lead 92, to microprocessor 60.

Vital signs monitor 50 may be of conventional design with an attaching clip 78 to a body portion of the firefighter 22, and is operatively coupled to microprocessor 60.

The environmental sensor 51 may be of conventional design with a sensing head 15 mounted on mask unit housing 30 for detecting poison gas and/or hydrocarbon levels about the mask unit 23. Environmental sensor 51 is operatively coupled to microprocessor 60. Environmental sensor 51 generates a signal 81 indicative of the monitored conditions and, via microprocessor 60 and transceiver 63, transmits such data to the command post 70 for monitoring.

In addition, microprocessor 60 causes speaker 62 to emit a series of beeps or other identifiable audible message or signal indicative of a hazardous condition. A motion detector 52 which may be of conventional design is mounted within mask attachment unit 23 for detecting when the wearer/ firefighter is motionless for a predetermined period, and therefore, is presumed unconscious and in need of help. Motion detector 52 is operatively coupled, via microprocessor 60 and transceiver 63, to the command post 70. The command post 70 includes a programmed microprocessor 60 for signaling an alarm at the command post, for example on monitor 71.

The mask unit's microprocessor 60 is programmed to activate the location beacon 56, for example a flashing light 56, affixed to the mask attachment unit cap 30. Also, it is contemplated that an audio alarm signal may be activated, for example, a series of beeps from speaker 62, under the control of microprocessor 60. In this manner, locating the injured and unconscious firefighter is facilitated by means of both audio and light signals.

It should be noted that another important feature of the present invention is the provision of a voice activated help alarm signal 83. This help signal 83,84 is generated either by the firefighter verbally requesting "HELP" or by activation of a manual help switch 93 located on the mask attachment unit 23.

Upon activation of the "HELP" signal 83,84 either verbally or manually, the microprocessor 60 causes a help request signal to be transmitted, via transceiver 63, and also activates the location beacon 56 and/or speaker 62 to generate the above described tracking lights/beeps.

The environmental alarm logic circuitry 51 which processes the data from the environmental sensor head 15 and provides a signal 81 to microprocessor 60 indicative of the type and level of air contamination, i.e., poisons or hydrocarbons. This signal 81, via microprocessor 60 and transceiver 63, is transmitted to the command post 70 for further consideration and actions required to protect the firefighter 22.

The evacuate site alarm 58 is indicative of the logic circuitry and alarm device 56 used to direct the firefighter to evacuate the building or area. For example, the command post personnel may selectively, via verbal communications, instruct one or more of the firefighters to vacate due to a dangerous condition. In addition, the command post 70, via transceiver 74,63, may activate the evacuate site alarm 58 devices on the mask attachment units 23. Thus, both speaker 62 and the light beacon 56 are caused to generate a light/ noise signal.

The signal transmitter means 25 is mounted within said inner housing means and is responsive to a help voice communication for transmitting a signal 83 indicative of the voice communication through the mask lens without degradation The circuitry 28 is operatively coupled to the battery energy source 27 and speaker 62 by conventional means (not shown).

Speaker 62 may comprise a piezoelectric element or other small and light weight type of speaker suitable for the heat conditions that may be encountered by a firefighter 22. Likewise, the signal pick-up element may comprise a piezoelectric element or other suitable element.

Housing member 30 has a generally tubular or oval configuration with an alcove, male treads 65 and a rear opening.

Microphone 61, battery energy source 27, associated (conventional) circuitry and transmitter element or antenna 25 are operatively coupled together in conventional manner. Since the microphone 61, battery energy source 27, transmitter 63 and associated circuitry may be of conventional design that does not require invention, exhaustive details thereof shall not be provided herein to avoid prolixity. Preferably, the microphone 61 is of a noise canceling type to reduce noise from breathing.

It should be understood that the important features of the present invention resides in the novelty of the combination of components, the use of a fully integrated safety and communications electronics as illustrated in FIG. 6,7 and 8, with a SCBA mask device, the construction arrangement to facilitate use, repair, replacement, installation, and changing of batteries, the elimination of connecting cables and the design features to enable affixing onto many different mask lens without obstructing vision or air passageways substantially. Although conventional circuit design may be utilized, FIGS. 9 and 10 illustrate one circuit design prepared for applicant's invention.

Figure 9:
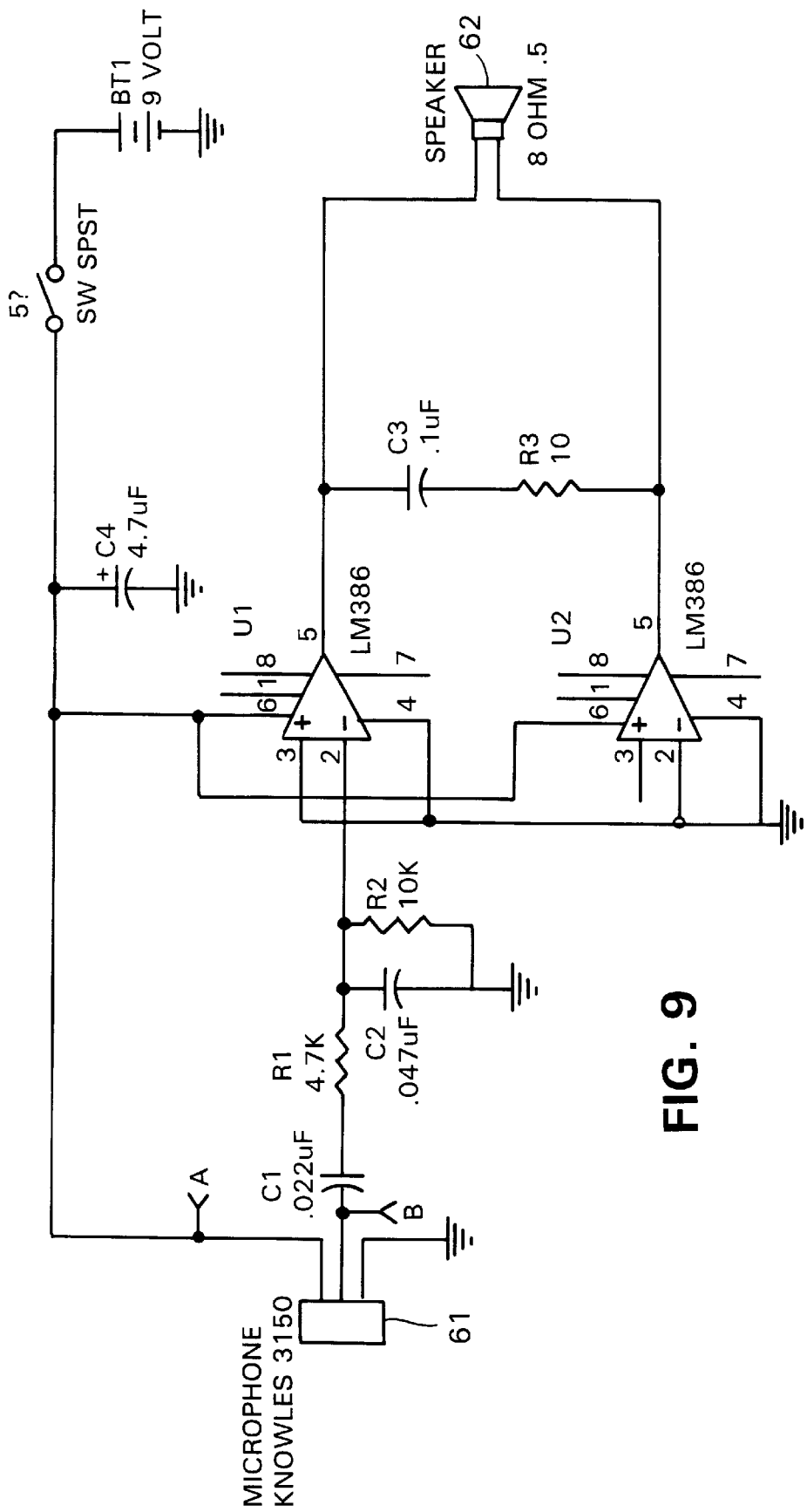
FIG. 9 shows the mask amplifier circuitry for amplifying the signal from the microphone 61 to speaker 62.

With reference now to FIG. 9, the mask unit 23 amplifier circuitry generally contained within the electronics package 28, is shown. Since the specific circuitry does not comprise a portion of the invention, detailed discussion thereon is not provided. Generally speaking, the amplifier circuitry is connected to microphone 61, for example, a Knowles 3150 unit, and to speaker 62. The amplifier circuitry is designed to amplify the output of microphone 61 and contains noise suppressing circuitry. This amplified voice signal is coupled to speaker 62 to provide a relatively clear and loud speech output from speaker 62.

Figure 10:
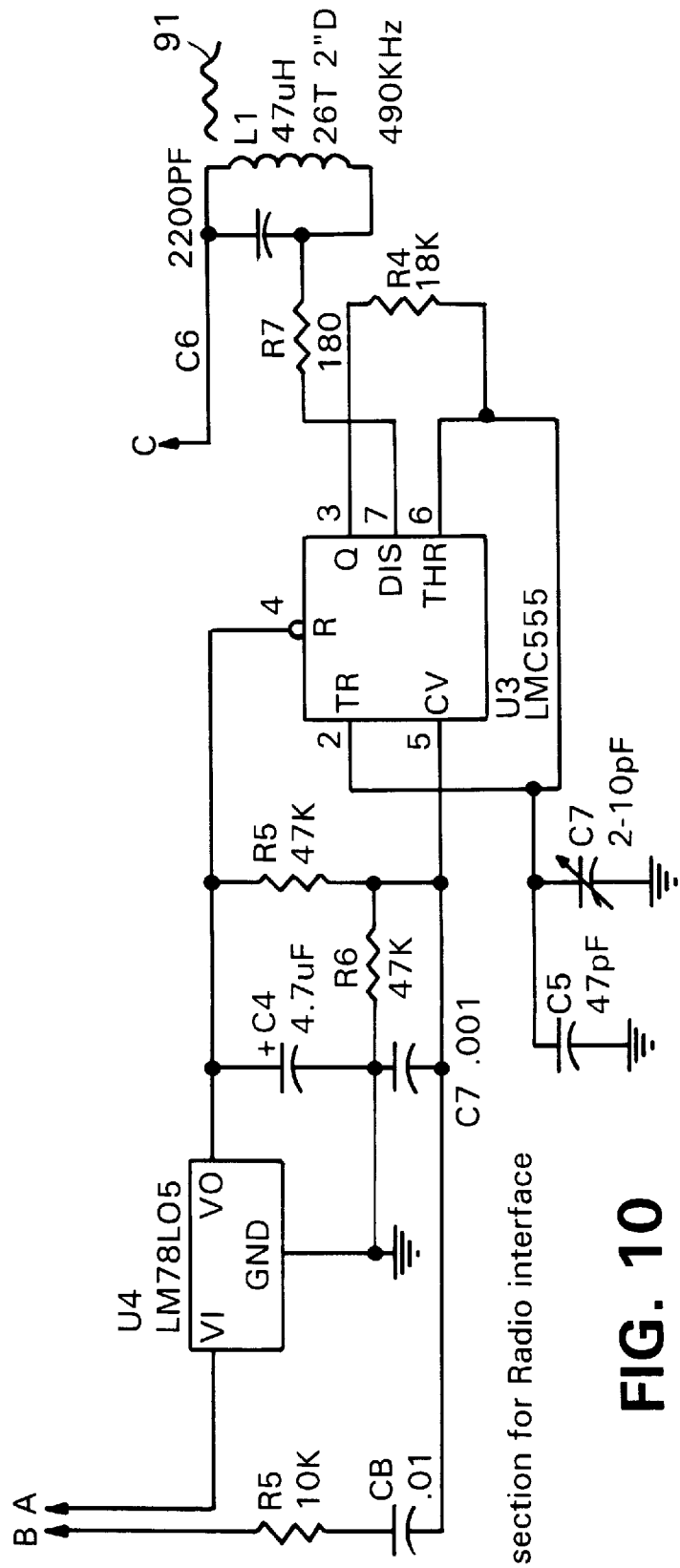
FIG. 10 shows the radio link circuitry.

With reference not to FIG. 10, the Radio Link circuitry is shown. The Radio Link circuitry is contained within electronics package 28. The microphone's speech signals are coupled, via leads A,B,C, to the Radio Link circuitry, which in turn transmits, via antenna 25, a corresponding radio signal 90 to the protable transceiver unit 11 and/or to transceiver 74. In this manner, back-up or dual transmit functions are provided for enhanced safety. It should be recognized that with use of the portable trasnceiver unit 11 switched on, that the transmit range is greater than is possible from the mask unit 23. However, antenna 25 is designed to transmit the signals 80–89 and, possibly the transmitted voice signal 90, to the command post 70.

Figure 11:
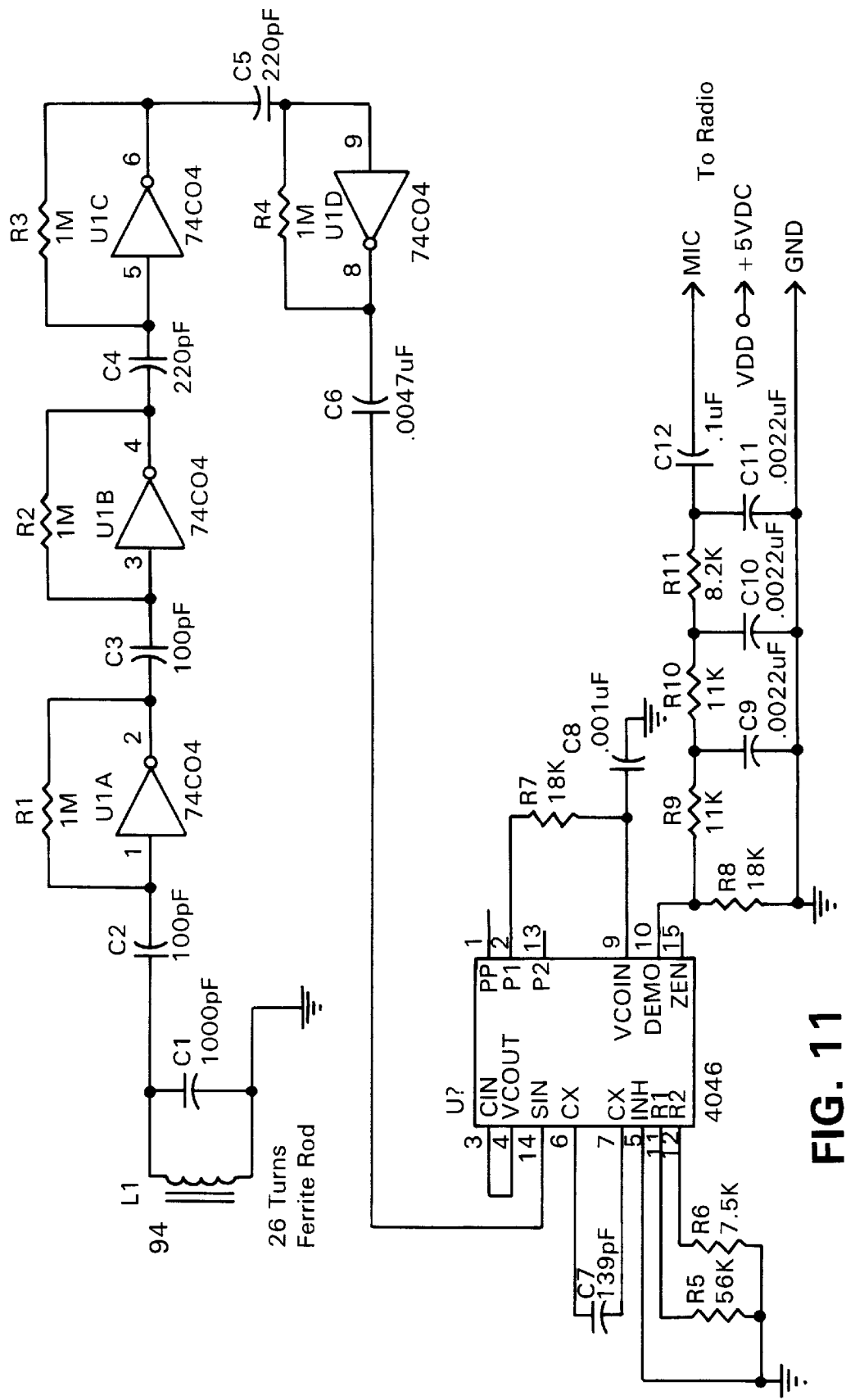
FIG. 11 shows the radio receiver circuit.

A standard portable transceiver 11 electronics is modified by the incorporation of the Radio Receiver Circuitry shown in FIG. 11. This circuit picks up, via pick-up coil 94, and effects or causes the portable transceiver unit 11 to transmit the voice signal 90 in an amplified strength to command unit 70. Such back-up systems are important due to the need for safety.

While a certain specific embodiment has been set forth of the invention for the sake of illustration to persons skilled in the art, it is not intended to be limitative. Consequently, the invention should be construed broadly in accordance with its full spirit and scope.

What is claimed is:

1. A communication and safety system having particular utility for use in combination with a self contained breathing apparatus type face mask used by a wearer such as a firefighter, comprising:
   a mask attached unit (23) for transmitting and receiving a plurality of data and/or communication signals;
   data collecting unit operable for collecting data and operatively connected to said mask attached means; and
   a command post unit (70) for monitoring said data/communication signals.

2. A communication and safety system as in claim 1, wherein:
   said data/communication signals include an environmental signal (81) representative of the hydrocarbon levels in the air surrounding the wearer of the face mask.

3. A communication and safety system as in claim 1, wherein:
   said data/communication signals include an environmental signal (81) representative of the poison gas levels in the air surrounding the wearer of the face mask.

4. A communication and safety system as in claim 1, wherein:
   said data communication signals include a motion detector signal (82) that is representative of the motionlessness of the wearer for a predetermined period and therefore of need for a rescue.

5. A communication and safety system as in claim 1, wherein:
   said data communication signals include a location beacon signal (86) that is representative of the need to locate and aid the wearer of the face mask and activates a location beacon (56) mounted on said mask attached unit to facilitate same.

6. A communication and safety system as in claim 1, including:
   an environmental alarm signal (87) for activating an environmental alarm indicator (57) on said mask attached unit.

7. A communication and safety system as in claim 1, including:
   an evacuate/vacate alarm signal (88) for activating an evacuate site alarm (58) on said mask attached unit.

8. A communication and safety system as in claim 1, including:
   a mask pressure unit (59) for monitoring the air pressure within said mask and generating a mask pressure signal (89) representative of the monitored air pressure.

9. A communication and safety system as in claim 1, including:
   a microprocessor (60) programmed for monitoring and processing said data/communication signals (80–90) to provide improved safety via activation of an alarm signal noise output from a speaker (62) and the transmission of an alert signal (90) to said command post means (70).

10. A communication and safety system as in claim 1, including:
    an environmental alarm signal (87) for activating a hazardous condition alarm (86) on said mask attached unit.

11. A communication and safety system as in claim 1, wherein:
    said command post unit includes a location detector (73) for tracking the location of each activated mask attached unit within a predetermined system.

12. A communication and safety system as in claim 1, wherein:
    said command post unit includes a location detector (73) for tracking the location of each activated mask attached unit within a predetermined region and a monitor (71) for visually displaying the general location of each activated mask attached unit and a recorder (72) for recording said data/communication signals (80-90).

13. A communication and safety system having particular utility for use in combination with a self contained breathing apparatus type face mask used by a wearer such as a firefighter, comprising:
    a mask attached unit for transmitting and receiving a plurality of data/communication signals; and
    a command post unit for monitoring said data/communication signals; wherein
    said data/communication signals include:
      a vital signs signal (80) representative of at least one vital sign of the wearer of the face mask;
      an activatable/help/distress signal (83, 84), and an identification signal (85).

14. A communication and safety system having particular utility for use in combination with a self contained breathing apparatus type face mask used by a wearer such as a firefighter, comprising:
    a mask attached unit (23) for transmitting and receiving a plurality of data/communication signals; and
    a command post unit (70) for monitoring said data/communication signals; wherein
    said data/communication signals include a vital signs signal (80) representative of the pulse rate of the wearer of the face mask.

15. A communication and safety system having particular utility for use in combination with a self contained breathing apparatus type face mask used by a wearer such as a firefighter s comprising:

a mask attached means (23) for transmitting and receiving a plurality of data/communication signals:

command post means (70) for monitoring said data/communications signals; and a three piece housing assembly means (30,33, 35) to enable relatively easy and quick mounting and disassembly for replacement of said mask attached unit and/or repair and/or replacement of a battery power source.

16. A communication and safety system for use in combination with a face mask such as utilized by firefighters, in combination, generally comprising:

a mounting member (33) dimensioned and contoured for being mounted to the face mask, and having a neck portion (36) dimensioned for extending into the interior side of the face mask and secured by a nut device (35);

a microphone (61) mounted on said neck portion for providing voice signals representative of the wearer's speech;

an air pressure sensor (59) mounted on said neck portion for providing a pressure signal (89) representative of the air pressure within the face mask;

a transceiver (63) operatively coupled to said microphone for transmitting a communication signal (90) representative of said voice signals;

an external housing (30) dimensioned and contoured for being mounted to said mounting member on the exterior of the face mask;

a power source operatively coupled to said microphone means and said transceiver;

a speaker (62) being responsive to said voice signals for producing an audible speech signal outside said face mask representative of and generally simulating the wearers speech into said microphone;

means (50, 77, 78) for monitoring a vital sign of the wearer and providing a vital signs data signal (80) representative thereof;

means (55, 60, 63) for transmitting a mask unit identification code signal (85);

means (15, 51, 60, 63) for monitoring and transmitting an environmental signal (81) representative of some or all of the temperature, hydrocarbon, and poisonous gas levels of the region surrounding the face mask;

means (52, 60, 63) for monitoring and transmitting a motion data signal (82) indicative of the wearer's being motionless for a predetermined period;

means (53, 54, 60, 63) for transmitting a distress-help signal (83, 84) indicative of a predetermined distress condition's being detected;

means (60, 63) for transmitting a locating or tracking signal to facilitate the rescue of a firefighter;

a command post unit (70) for monitoring the signals being transmitted by activated mask units for monitoring and/or directing the activities of each firefighter for maintaining accountability and tracking one or more firefighters at the site and for improving communications and safety of each firefighter wearing an activated mask unit.

17. A communication and safety system as in claim 16, including:

a mask attached unit (23) for transmitting and receiving a plurality of data/communication signals; and a three piece housing assembly means (30,33,35) to enable relatively easy and assembling and disassembling for replacement of said mask attached unit and/or repair and/or replacement of a battery power source.

18. A communication and safety system as in claim 16 further comprising a mask attachment unit (23) for transmitting and receiving a pluralit y of data/communication signals; wherein:

said command post means includes a location detector (73) for tracking the location of each activated mask attachment unit within a predetermined region and a monitor (71) for visually displaying the general location of each activated mask attachment unit and a recorded (72) for recording said data/communication signals (80–90).

19. A communication and safety system as in claim 16, wherein:

said vital sign signal (80) is representative of the pulse rate of the wearer of the face mask.

20. A communication and safety system as in claim 16, wherein:

said vital sign signal (80) is representative of at least one vital sign of the wearer of the face mask.

* * * * *

UNITED STATES PATENT AND TRADEMARK OFFICE
CERTIFICATE OF CORRECTION

PATENT NO.     : 5,990,793
DATED          : NOVEMBER 23, 1999
INVENTOR(S)    : JOHN S. BIEBACK

It is certified that error appears in the above-identified patent and that said Letters Patent is hereby corrected as shown below:

Cover page, [57] Abstract, line 2, after "mask", insert --. The system--.

Cover page 2, [56] References Cited, U.S. PATENT DOCUMENTS, at Granatiero, "455/66" should be --128/201.19--.

Cover page 2, [56] References Cited, U.S. PATENT DOCUMENTS, at Zuckerman et al., "381/168" should be --455/66--.

Column 2, line 39, "changability" should be --changeability--.

Column 2, line 62, "an" should be --a--.

Column 4, line 6, "standand" should be --standard--.

Column 4, line 44, "conscience" should be --conscious-- and "unconscience" should be --unconscious--.

Column 5, line 35, "increase" should be --increased--.

Column 5, line 57, "a" should be --an--.

Column 5, line 62, "FIREFIGHTERS" should be --firefighters--.

Column 5, line 67, "a" should be --an--.

Column 6, line 41, "FIG." should be --FIGS.--.

Column 6, line 46, after "speaking", insert --,--.

UNITED STATES PATENT AND TRADEMARK OFFICE
CERTIFICATE OF CORRECTION

PATENT NO. : 5,990,793
DATED : NOVEMBER 23, 1999
INVENTOR(S) : JOHN S. BIEBACK

It is certified that error appears in the above-identified patent and that said Letters Patent is hereby corrected as shown below:

Column 7, line 42, "FIG." should be --FIGS.--.

Column 7, line 44, after "30", delete ",".

Column 7, line 50, "signal" should be --alarm--.

Column 10, line 32, after "radiation", insert --.--.

Column 10, line 56, "FIG." should be --FIGS.--.

Column 11, line 14, "protable" should be --portable--.

Column 11, line 17, "trasnceiver" should be --transceiver--.

Column 13, line 6, ":" should be --;--.

Column 14, lines 27, 32, and 34, "attachment" should be --attached--.

Signed and Sealed this

Twenty-fourth Day of April, 2001

Attest:

NICHOLAS P. GODICI

Attesting Officer

Acting Director of the United States Patent and Trademark Office